United States Patent Office.

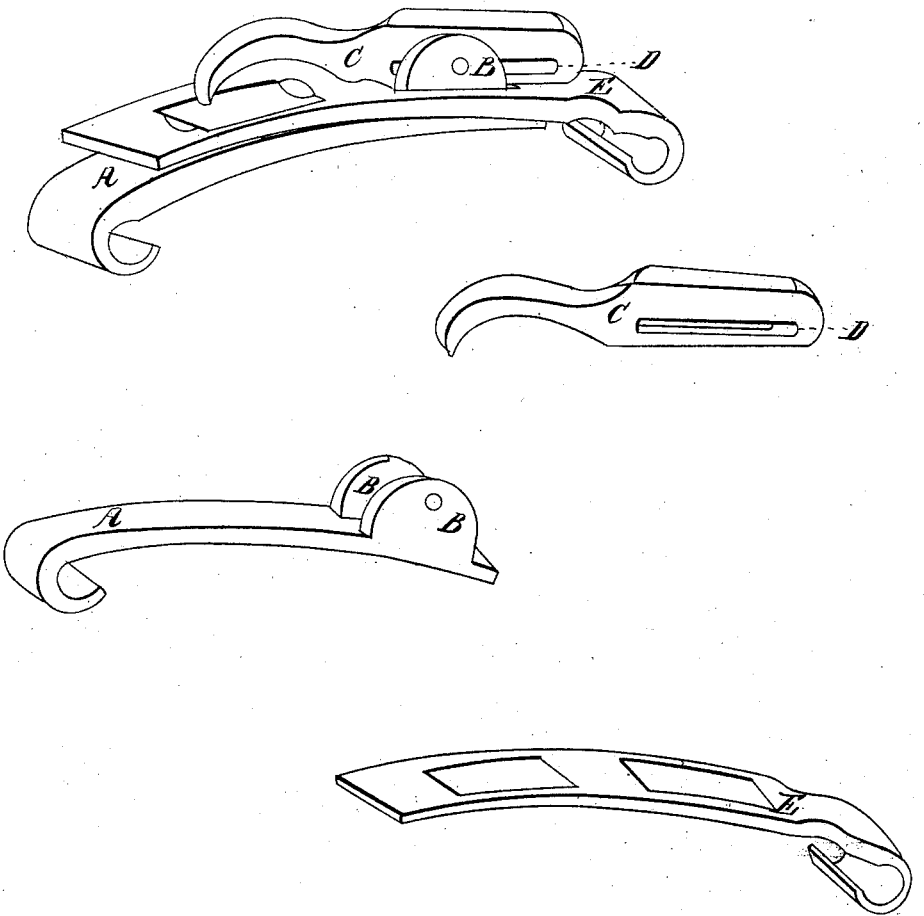

JOSEPH A. STANSBURY, OF MARION, IOWA.

Letters Patent No. 76,356, dated April 7, 1868.

IMPROVED HAMES-LOCK.

*The Schedule referred to in these Letters Patent and making part of the same.*

TO ALL WHOM IT MAY CONCERN:

Be it known that I, JOSEPH A. STANSBURY, of Marion, in the county of Linn, in the State of Iowa, have invented new and useful Improvements in Hames-Locks; and I do hereby declare that the following is a full and exact description thereof, reference being had to the accompanying drawings, and the letters of reference marked thereon.

The nature of my invention consists in providing a substitute for that part of a harness known as the hames-strap, which shall be more durable and substantial than the old style of strap and buckle.

To enable others skilled in the art to make and use my invention, I will proceed to describe its construction and operation.

My improved hames-lock is a combination of three castings in malleable iron or other material, constructed in the following manner: The main plate A being curved to fit the lower end of the collar, is provided with a suitable hook, with which it may be fastened to one of the hames. The other end of said plate is provided with two ears, B B, through which passes a strong rivet. Said rivet secures between the ears B B the slotted lever C, by passing through the slot D, in the lever C. To be attached to the other hame is another plate, E, also provided with a hook for the purpose. Said plate is also curved to fit the collar in the last-named plate. At suitable distances from its hook are one or more holes, each of which is large enough to admit the two ears B B of the plate A.

The manner of operating my improved hames-lock is as follows: Draw the lever C toward the hook on the plate A, so far as the slot and rivet will permit. Then throw the handle of the lever C over from the hook on the plate A; insert the outer end of the lever C into one of the holes in the plate E, at the same time pressing the said plate E toward the ears B B. Then throw the handle of the lever C back toward the hook on the plate A, which will bring the plate E into its proper position over the ears B B. Next move the lever C in such a manner that the rivet passing through the ears B B shall be brought into that end of the slot nearest the middle of the lever C. By draught upon the hames, or the natural spring of a collar, the tendency to straighten the curve in the two main plates immediately beneath the lever, binds the lever C upon the plate E in such a manner that the said lever may not easily become unfastened by accident. To unlock this device, slide the lever C toward the hook on the plate A, so far as the slot and rivet will permit; throw the handle of the lever C over from the said hook on the plate A, after which the plate E may be easily disengaged from the ears B B, and the hames easily removed.

*Claims.*

What I claim as my invention, and desire to secure by Letters Patent, is—

1. The slotted lever C, when used as and for the purpose specified and set forth.

2. In combination with the manner of binding the lever C in its proper position, by the tendency of the two curved plates A and E to straighten when under lengthwise strain, as within substantially described.

JOSEPH A. STANSBURY.

Witnesses:
C. M. DUKES,
J. C. FOSTER.